Aug. 21, 1951  C. J. ENGLE  2,564,964
MANUFACTURE OF SATURATED HYDROCARBON MATERIALS
Filed Nov. 19, 1948
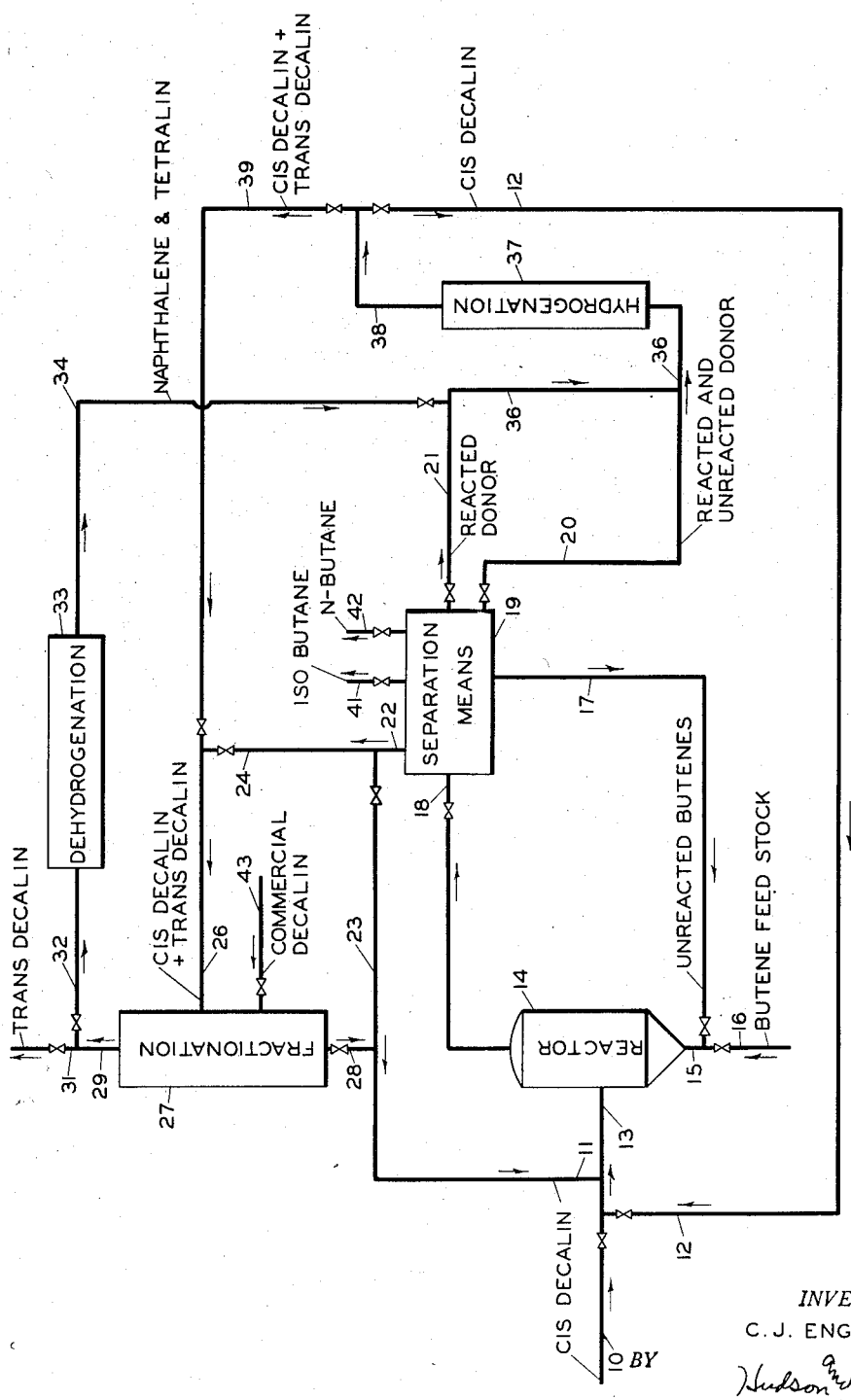
INVENTOR.
C. J. ENGLE
BY
Hudson and Young
ATTORNEYS Patented Aug. 21, 1951

2,564,964

UNITED STATES PATENT OFFICE 2,564,964

MANUFACTURE OF SATURATED HYDROCARBON MATERIALS

Charles J. Engle, Bartlesville, Okla., assignor to Phillips Petroleum Company, a corporation of Delaware Application November 19, 1948, Serial No. 60,907

11 Claims. (Cl. 260—683.6)

This invention relates to hydrogen transfer. In one aspect this invention relates to the manufacture of paraffinic hydrocarbons from the corresponding olefins. In another aspect this invention relates to the use of a novel hydrogen donor in a hydrogen transfer step.

Various compounds are known which contain combined hydrogen in an unstable state of combination at high temperatures, and many of these compounds are excellently well-suited for carrying out the hydrogenation and reduction of unsaturated materials. If an unsaturated material is heated in the presence of one of these compounds containing hydrogen in unstable combination, under suitable temperature and pressure conditions, unstably combined hydrogen is transferred from that compound to a double bond of the unsaturate and brings about its hydrogenation or reduction. Such a reaction is commonly referred to as hydrogen transfer, and the compound furnishing the hydrogen is usually referred to as a hydrogen donor and is so designated herein.

Various hydrogen donors have been disclosed by workers in the art and include such compounds as tetralin, commercial decalin, hydrogenated anthracene, and the like.

This invention is concerned with the manufacture of saturated hydrocarbons from unsaturated hydrocarbon materials by a hydrogen transfer method employing a new and novel hydrogen donor.

An object of this invention is to provide a process for the manufacture of saturated hydrocarbon materials.

Another object is to provide a process for the manufacture of paraffin hydrocarbons from olefin hydrocarbons, by hydrogen transfer.

Another object is to provide a hydrogen transfer process wherein a new and novel hydrogen donor is utilized.

Another object is to provide a process for the manufacture of an isoparaffin from a n-olefin.

Other objects will be apparent to one skilled in the art, from the accompanying discussion and disclosure.

In accordance with my invention, unsaturated hydrocarbon materials are converted to more saturated materials in a hydrogen transfer process utilizing cis decalin as a hydrogen donor.

I have discovered that cis decalin is a much more liberal donor in hydrogen transfer reactions than is trans-decalin, and that if instead of employing commercial decalin, which is a mixture of cis and trans compounds containing a large proportion of trans decalin, I employ cis decalin, I obtain hydrogen transfer of greatly improved efficiency.

Cis decalin for use in the practice of my invention may be obtained from any source. However, commercial decalin serves as a suitable source of cis decalin for use in the practice of my invention. When utilizing commercial decalin in this way, I have found that when removing only a part of the trans isomer, I obtain a hydrogen donor more active than the commercial decalin, although the most active donor is obtained when the trans isomer is completely removed. Unsaturated hydrocarbon materials that may be converted to compounds of higher saturation in accordance with my invention include normally gaseous olefins, light olefin hydrocarbons, or pentenes, hexenes, heptenes, and the like, and heavier unsaturated components of distillates, such as of gas oils and the like. Mixtures of such olefins as those specifically mentioned herein, may be converted in the practice of my invention.

In order to present my invention more clearly, reference is made to the attached figure, which is a diagrammatic representation of apparatus which can be used in the practice of a preferred embodiment of my invention. It is to be understood that the figure is diagrammatic and that various modifications may be made and still remain within the scope of my invention. Referring to the figure, cis decalin from line 10 and recycled cis decalin from lines 11 and 12, each hereafter described, are passed through line 13 to reactor 14 containing a fixed bed of a silica-metal oxide catalyst comprising from 1 to 90 per cent alumina, described more fully hereafter, together with hydrocarbon charge from line 15 comprising fresh butene feed stock from line 16 and recycled butenes from line 17 described hereafter. Materials in lines 13 and 15 are passed to reactor 14 in a respective mole ratio within the limits of about 0.5:1 to 5:1, preferably about 1:1. Space velocities of fresh feed and cis decalin are each in the order of about 100 to 600 gas volumes per catalyst volume per hour. Catalyst in reaction zone 14 is maintained at a temperature in the range of from 325 to 400° C. Pressures in zone 14 are maintained usually atmospheric, although subatmospheric or elevated pressures may be utilized. Total effluent from reactor 14 is passed through line 18 to separation means 19, comprising coolers, separators, distillation equipment, storage tanks and the like, not individually illustrated, which can be used to effect a separation of various product fractions contained in the materials in line 18. In separation zone 19, reacted donor, comprising tetralin, $C_{10}H_{12}$, and/or naphthalene, $C_{10}H_8$, and any unreacted donor, are separated from each other and from the total effluent. Unreacted donor, i. e. $C_{10}H_{18}$, comprises cis decalin, sometimes having been partially isomerized in zone 14 to the trans isomer, depending on the temperature and pressure conditions therein, and is recycled through lines 22, 23, 11 and 13 to reactor 14, when it contains no trans isomer. When any trans isomer is present, material in line 22 is passed through lines 24 and 26 to fractionation zone 27 wherein cis decalin and trans decalin are separated, cis decalin being passed as bottoms product therefrom through lines 28, 11 and 13 to reactor 14, and trans decalin being passed as overhead product through lines 29 and 31 to further utilization, not shown. However, it may be preferable, depending upon the amount of trans isomer overhead in line 29, to convert the trans decalin to the cis isomer. Accordingly, when it is desired to convert trans decalin from line 29 to the cis isomer, materials from line 29 may be passed through line 32 to dehydrogenation zone 33 and therein heated at a dehydrogenating temperature, usually in the range of 200 to 400° C. in the presence of a suitable dehydrogenation catalyst such as, chromia, bauxite, and the like, to form tetralin and/or naphthalene. Reacted donor, separated in zone 19 is passed through line 21 and admixed in line 36 with dehydrogenation product from zone 33 passed through line 34, and the resulting admixture regenerated, i. e., rehydrogenated in hydrogenation zone 37, to cis decalin or to a cis decalin-trans decalin mixture, depending on the hydrogenation conditions employed. For example when a nickel hydrogenation catalyst is employed in zone 37, relatively high yields of trans decalin are obtained, while on the other hand, in the presence of platinum black catalyst the hydrogenation product is substantially completely cis decalin. Rehydrogenated product is passed from zone 37 through lines 38, 39 and 26 to fractionation zone 27 when it contains any trans decalin, and in the absence of any trans decalin, material in line 38 is passed through lines 12 and 13 and recycled to reactor 14. Any unreacted portion of olefins, introduced through line 16 to reactor 14, is separated in zone 19 and recycled therefrom to zone 14 through line 17. From zone 19 is withdrawn isobutane through line 41 and normal butane through line 42 as products of the process.

If desired, a donor fraction containing both reacted donor and unreacted donor may be separated in zone 19 and passed to regeneration zone 37 through lines 20 and 36.

Commercial decalin may be utilized as a source of cis decalin or of make-up cis decalin, as desired, by its introduction to fractionation zone 27 through line 43.

For convenience and clarity certain apparatus such as pumps, surge tanks, accumulators, valves, etc. have not been shown in the drawing. Obviously, such modifications of the present invention may be practiced without departing from the scope of the invention.

Preferably, silica-metal oxide catalysts are employed in the hydrogen transfer process of my invention.

I may employ a silica-metal oxide type catalyst prepared by first forming a hydrous acidic silica gel by adding an alkali silicate to an excess of an acid, washing soluble material from resulting gel, treating or activating the gel with an aqueous solution of a suitable metal and subsequently washing and drying the treated material. In this manner, a part of the metal, presumably in the form of a hydrous oxide, or loose hydroxide compound formed by hydrolysis is selectively adsorbed by the hydrous silica, and is not removed by subsequent washing. The most often used catalyst of this type, at present, is a silica-alumina catalyst, prepared by treating a wet or partially dried hydrous silica gel with an aluminum salt solution and subsequently washing and drying the treated material. However, catalysts of a very similar nature, but differing among themselves as to one or more specific properties, may be prepared by using, instead of an aluminum salt, a hydrolyzable salt of a metal selected from group III B or from group IV A of the periodic system and may be referred to in general as "silica-metal oxide type" catalysts. As listed in "Modern Inorganic Chemistry" by J. W. Mellor (Longmans, Green & Co. (1939), revised and edited by G. D. Parkes) on page 118 group III B consists of boron, aluminum, gallium, indium and thallium, and group IV A consists of titanium, zirconium, hafnium and thorium. More particularly, salts of indium and thallium in addition to aluminum in group III B may be used, and salts of titanium, zirconium and thorium in group IV A may be used to treat silica gel and to prepare catalysts of this general type.

Another feature of my invention is a concomitant isomerization to produce the more highly branched saturated hydrocarbon products, the extent of isomerization depending on the specific olefin charge stock and the catalyst employed. For example, when feeding isobutene and employing a silica-alumina type catalyst containing as high as 25 per cent alumina, a very small amount of normal butane isomerization product is formed. However, when feeding a normal butene and employing a silica-alumina type catalyst of high silica content, extensive isomerization takes place and the product contains significantly high yields of isobutane.

My invention is illustrated by the following examples. The reactants, their proportions, and other specific ingredients are presented as being typical and should not be construed to limit the invention unduly.

*Example I*

Isobutene was charged continuously together with trans decalin through a fixed bed of a silica-alumina catalyst containing 75 weight per cent silica and 25 weight per cent alumina, at a space velocity of 484 standard gas volumes isobutene per catalyst volume per hour, and 495 standard gas volumes trans decalin per catalyst volume per hour. The temperature in the catalyst zone was maintained at 338° C. and the run was conducted at atmospheric pressure.

Total effluent from the catalyst zone was recovered and fractionated. The total decalin-free hydrocarbon effluent had the following composition:

|  | Mole per cent |
|---|---|
| Propane and lighter | 2.6 |
| Butanes-butenes | 95.4 |
| Pentanes and heavier | 2.0 |
| Total | 100.0 |

The butanes-butenes fraction had the following composition:

|  | Mole per cent |
|---|---|
| Iso-butane | 29.3 |
| n-Butane | 0.2 |
| Iso-butene | 65.1 |
| Butene-1 | 2.0 |
| Trans-butene-2 | 2.0 |
| Cis-butene-2 | 1.4 |
| Total | 100.0 |

Of the total isobutene charged, 22.4 per cent was reacted. Of the reacted isobutene, 45 per cent was converted to isobutane.

Example II

Isobutene was charged continuously together with cis decalin through a fixed bed of a silica-alumina catalyst containing 75 weight per cent silica and 25 weight per cent alumina, at a space velocity of 505 standard gas volumes isobutene per catalyst volume per hour, and 475 standard gas volumes cis decalin per catalyst volume per hour. The temperature in the catalyst zone was maintained at 339° C. and the run was conducted at atmospheric pressure.

Total effluent from the catalyst zone was recovered and fractionated. The total decalin-free hydrocarbon effluent had the following composition:

| | Mole per cent |
|---|---|
| Propane and lighter | 2.4 |
| Butanes-butenes | 96.6 |
| Pentanes and heavier | 1.0 |
| Total | 100.0 |

The butanes-butenes fraction had the following composition:

| | Mole per cent |
|---|---|
| Iso-butane | 71.0 |
| n-Butane | 0.8 |
| Iso-butene | 25.8 |
| Butene-1 | 0.8 |
| Trans-butene-2 | 0.9 |
| Cis-butene-2 | 0.7 |
| Total | 100.0 |

Of the total isobutene charged, 61 per cent was reacted. Of the reacted iso-butene, 78.5 per cent was converted to isobutane.

Example III

Butene-1 was charged continuously together with commercial decalin, distilled to remove tetralin and naphthalene impurities, through a fixed bed of silica-alumina catalyst containing 99 per cent silica and 1 per cent alumina at a space velocity of 72 standard gas volumes butene-1 per catalyst volume per hour and 131 standard gas volumes distilled commercial decalin per catalyst volume per hour. The temperature in the catalyst zone was maintained at 400° C. and the run was conducted at atmospheric pressure.

96 per cent of the total decalin-free hydrocarbon effluent was a pentane and lighter fraction of the following composition:

| | Mole per cent |
|---|---|
| Propane | 7.8 |
| Butenes | 1.5 |
| n-Butane | 21.2 |
| i-Butane | 57.9 |
| Pentane | 11.6 |
| Total | 100.0 |

Both extensive isomerization and hydrogen transfer took place as indicated by the presence of 57.9 per cent isobutene in the pentane and lighter product.

Of the butene-1 charged, 72.5 per cent was converted to isobutane. Of the butene-1 reacted, 74 per cent was converted to isobutane.

As will be evident to those skilled in the art, various modifications of this invention can be made, or followed, in the light of the foregoing disclosure and discussion, without departing from the spirit of scope of the disclosure or from the scope of the claims.

I claim:

1. The method of manufacturing a paraffin hydrocarbon from an olefin hydrocarbon by hydrogen transfer from a hydrogen donor, comprising heating such an olefin hydrocarbon in admixture with a hydrogen donor consisting essentially of cis decalin, in the presence of a silica-metal oxide catalyst at a temperature at which the combination of hydrogen in said donor compound is unstable and at least a portion of said donor becomes spent to form a corresponding naphthalene containing at least 8 and not more than 12 hydrogen atoms per molecule, and recovering a resulting paraffin hydrocarbon as a product of the process.

2. A method for the manufacture of a paraffin hydrocarbon from the corresponding olefin by hydrogen transfer comprising heating said olefin in admixture with a hydrogen donor consisting essentially of cis decalin, in the presence of a synthetic silica-alumina as a catalyst at a temperature within the range of 325 to 400° C., separating total product of said heating into a fraction containing donor at least partially spent to form a corresponding naphthalene containing at least 8 and not more than 12 hydrogen atoms per molecule and a hydrocarbon fraction containing paraffin hydrocarbon product, in a regeneration step contacting donor thus separated with hydrogen under hydrogenation conditions, recycling regeneration effluent to said heating, and recovering said paraffin hydrocarbon product.

3. The method of manufacturing a paraffin hydrocarbon from the corresponding olefin by hydrogen transfer comprising heating said olefin in admixture with a hydrogen donor consisting essentially of cis decalin, in a mole ratio of said olefin to said donor in the range of 0.5:1 to 5:1, in the presence of a silica-alumina catalyst maintained at a temperature in the range of 325 to 400° C. and prepared by first forming a hydrous acidic silica gel by adding sodium silicate to an excess of an acid, washing soluble material from the resulting gel, activating the gel with an aqueous aluminum salt and subsequently washing and drying the activated material, separating total product of said heating into a fraction containing donor at least partially spent to form a corresponding naphthalene containing at least 8 and not more than 12 hydrogen atoms per molecule and a hydrocarbon fraction containing paraffin hydrocarbon product, in a regeneration step hydrogenating unsaturates present in the donor thus separated, recycling cis decalin from said regeneration to said heating, and recovering said paraffin hydrocarbon product.

4. A continuous process for the manufacture of a normally gaseous paraffin hydrocarbon from a normally gaseous olefin comprising passing such an olefin together with a hydrogen donor consisting essentially of cis decalin, at a space velocity of said olefin within the range of 100 to 600 gas volumes per catalyst volume per hour and at a space velocity of said donor within the range of 100 to 600 standard gas volumes per catalyst volume per hour through a fixed bed of silica-alumina catalyst maintained at a temperature in the range of 325 to 400° C. and prepared by first forming a hydrous acidic silica gel by adding sodium silicate to an excess of an acid, washing soluble material from the resulting gel, activating the gel with an aqueous aluminum salt and subsequently washing and drying the activated material, passing effluent from the zone of said catalyst and resolving same into a paraffin hydrocarbon-rich fraction and a fraction containing reacted donor, in a regeneration step passing said fraction containing reacted donor to a hydrogenation zone and therein regenerating said reacted donor by hydrogenation, recovering cis decalin as a product of said regenerating, recycling cis decalin regeneration product to said catalyst zone, separating said paraffin hydrocarbon-rich fraction into a normally gaseous paraffin fraction and a fraction containing unreacted olefin, recycling said unreacted olefin to said catalyst zone, and recovering a paraffin hydrocarbon as a product of the process.

5. The process of claim 4 wherein said normally gaseous olefin comprises a butene and said paraffin comprises isobutane.

6. The process of claim 4 wherein said olefin is butene-2, said catalyst contains from 1 to 25 per cent alumina and said paraffin comprises isobutane.

7. The process of claim 4 wherein said olefin is isobutene, said catalyst contains from 20 to 30 per cent alumina and said paraffin comprises isobutane.

8. In a hydrogen transfer process employing an isomeric mixture of decalins as a hydrogen donor in the conversion of an olefin hydrocarbon to a paraffin hydrocarbon, the improvement comprising recovering a hydrogen donor consisting essentially of cis decalin from said isomeric mixture, and employing the donor thus recovered as the sole donor in said conversion.

9. In a hydrogen transfer process employing an isomeric mixture of decalins as a hydrogen donor in the conversion of an olefin hydrocarbon to a paraffin hydrocarbon, the improvement comprising removing trans isomer from said isomeric mixture and employing resulting residual decalin as said donor.

10. A continuous process for the manufacture of isobutane from isobutene, comprising passing isobutene together with a hydrogen donor consisting essentially of cis decalin in a mol ratio of said isobutene to said donor in the range of 0.5:1 to 5:1, through a fixed bed of a synthetic silica-alumina as a catalyst maintained at a temperature in the range of 325 to 400° C., at a space velocity of said isobutene and said donor each within the range of 100 to 600 gas volumes per volume of catalyst per hour, passing effluent from the zone of said catalyst, recovering an isobutane-rich fraction and a donor-rich fraction from said effluent, said donor-rich fraction containing reacted donor and said isobutane-rich fraction containing unreacted isobutene, passing said donor fraction to a hydrogenation zone and therein regenerating said reacted donor by hydrogenation, recovering cis decalin from the total product of said regeneration, recycling cis decalin thus recovered to said catalyst zone, separating isobutene from said isobutane-rich fraction and recycling isobutene thus recovered to said catalyst zone, and recovering isobutane as a product of the process.

11. A continuous process for the manufacture of isobutane from n-butene, comprising passing n-butene together with a hydrogen donor consisting essentially of cis decalin, in a mol ratio of said n-butene to said donor in the range of 0.5:1 to 5:1, through a fixed bed of a synthetic silica-alumina as a catalyst maintained at a temperature in the range of 325 to 400° C., at a space velocity of said n-butene and said donor each within the range of 100 to 600 gas volumes per volume of catalyst per hour, passing effluent from the zone of said catalyst, recovering an isobutane-rich fraction and a donor-rich fraction from said effluent, said donor-rich fraction containing reacted donor and said isobutane-rich fraction containing unreacted n-butene, passing said donor fraction to a hydrogenation zone and therein regenerating said reacted donor by hydrogenation recovering cis decalin from the total product of said regeneration, recycling cis decalin thus recovered to said catalyst zone, separating n-butene from said isobutane-rich fraction and recycling n-butene thus recovered to said catalyst zone, and recovering isobutane as a product of the process.

CHARLES J. ENGLE.

REFERENCES CITED

The following references are of record in the file of this patent:

UNITED STATES PATENTS

| Number    | Name    | Date          |
|-----------|---------|---------------|
| 2,241,393 | Danner  | May 13, 1941  |
| 2,328,755 | Thomas  | Sept. 7, 1943 |
| 2,472,254 | Johnson | June 6, 1949  |

FOREIGN PATENTS

| Number  | Country | Date         |
|---------|---------|--------------|
| 846,480 | France  | June 5, 1939 |

OTHER REFERENCES

Miall, Dictionary of Chemistry, 2nd ed. (1949), page 167.